(12) United States Patent
Lima

(10) Patent No.: US 12,241,377 B2
(45) Date of Patent: Mar. 4, 2025

(54) TURBOMACHINE MODULE EQUIPPED WITH A BLADE PITCH-CHANGING SYSTEM OF A STATOR VANE

(71) Applicant: SAFRAN AIRCRAFT ENGINES, Paris (FR)

(72) Inventor: Christophe Lima, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 17/800,067

(22) PCT Filed: Feb. 17, 2021

(86) PCT No.: PCT/FR2021/050282
§ 371 (c)(1),
(2) Date: Aug. 16, 2022

(87) PCT Pub. No.: WO2021/165616
PCT Pub. Date: Aug. 26, 2021

(65) Prior Publication Data
US 2023/0079110 A1    Mar. 16, 2023

(30) Foreign Application Priority Data
Feb. 19, 2020 (FR) .................................... 2001674

(51) Int. Cl.
*F01D 17/14* (2006.01)
*B64C 11/32* (2006.01)
(Continued)

(52) U.S. Cl.
CPC ............ *F01D 17/141* (2013.01); *B64C 11/32* (2013.01); *B64D 27/10* (2013.01); *F01D 9/041* (2013.01); *F01D 17/162* (2013.01)

(58) Field of Classification Search
CPC ...... F01D 17/162; F01D 17/141; F01D 17/16; F01D 17/167; F05D 2240/12;
(Continued)

(56) References Cited

U.S. PATENT DOCUMENTS 2,924,375 A * 2/1960 McKissock ........... F01D 17/162
                                                            415/150
2,999,630 A    9/1961 Warren et al.
(Continued)

FOREIGN PATENT DOCUMENTS

FR    2485621 A1    12/1981
FR    3055310 A1     3/2018
FR    3082230 A1 * 12/2019 ............. B64C 11/32

OTHER PUBLICATIONS

English Translation of FR 3082230 (Year: 2019).*
(Continued)

*Primary Examiner* — Brian Christopher Delrue
(74) *Attorney, Agent, or Firm* — Christensen O'Connor Johnson Kindness PLLC

(57) ABSTRACT

A turbomachine module with a longitudinal axis comprising an unducted propeller rotated about the longitudinal axis and at least one straightener. The module includes a plurality of unducted variable-pitch stator blades extending along a radial axis, perpendicular to the longitudinal axis, from a fixed casing. The module includes a first stator blade pitch-changing system. The pitch-changing system includes at least one first control that includes a first fixed body connected to the fixed casing and a first body which is axially mobile in relation to the first fixed body and at least one first joining mechanism joining each stator blade to the first mobile body of the first control. The first joining mechanism includes: a joining ring centered on the longitudinal axis, joined to the feet of each stator blade and at least one lever
(Continued)

joined, on one hand, to the joining ring and, on the other hand, to the first mobile body of the first control.

19 Claims, 4 Drawing Sheets

(51) Int. Cl.
*B64D 27/10* (2006.01)
*F01D 9/04* (2006.01)
*F01D 17/16* (2006.01)

(58) Field of Classification Search
CPC ............ F05D 2250/40; F05D 2250/42; F05D 2260/50; Y02T 50/671; F04D 29/563
See application file for complete search history.

(56) References Cited

U.S. PATENT DOCUMENTS

| | | | | |
|---|---|---|---|---|
| 3,861,822 A * | 1/1975 | Wanger | ................. | F04D 29/563 |
| | | | | 415/162 |
| 4,080,785 A * | 3/1978 | Koff | ................. | F02K 3/077 |
| | | | | 60/226.3 |
| 4,430,043 A * | 2/1984 | Knight | ................. | F04D 29/563 |
| | | | | 415/149.4 |
| 4,546,606 A * | 10/1985 | Bouiller | ................. | F01D 17/162 |
| | | | | 60/262 |
| 5,259,187 A * | 11/1993 | Dunbar | ................. | F02K 3/06 |
| | | | | 60/226.3 |
| 5,692,879 A * | 12/1997 | Charbonnel | ......... | F04D 29/563 |
| | | | | 415/162 |
| 5,794,432 A * | 8/1998 | Dunbar | ................. | F02K 1/16 |
| | | | | 60/226.1 |
| 5,993,152 A * | 11/1999 | Schilling | ............... | F01D 17/162 |
| | | | | 415/155 |
| 7,037,070 B2 * | 5/2006 | Raine | ................. | F04D 27/0246 |
| | | | | 415/149.4 |
| 10,167,872 B2 * | 1/2019 | Davidson | ............. | F04D 29/563 |
| 10,526,911 B2 * | 1/2020 | Pratt | .................... | F01D 17/162 |
| 10,815,802 B2 * | 10/2020 | Prasad | ................. | F01D 9/041 |
| 2006/0263206 A1 * | 11/2006 | Bouru | ................. | F01D 17/162 |
| | | | | 415/159 |
| 2010/0158662 A1 * | 6/2010 | Colotte | ............... | F04D 27/0246 |
| | | | | 415/33 |
| 2011/0167792 A1 * | 7/2011 | Johnson | ............... | F01D 17/162 |
| | | | | 60/226.3 |
| 2014/0075956 A1 * | 3/2014 | Patsouris | ............... | F02C 6/08 |
| | | | | 60/785 |
| 2016/0069275 A1 * | 3/2016 | Lecordix | .................. | F02C 9/22 |
| | | | | 415/146 |
| 2017/0102006 A1 * | 4/2017 | Miller | .................. | F04D 29/563 |
| 2018/0058260 A1 * | 3/2018 | Cottet | ................... | B64D 27/10 |

OTHER PUBLICATIONS

International Search Report mailed May 27, 2021, issued in corresponding International Application No. PCT/FR2021/050282, filed Feb. 17, 2021, 3 pages.

Written Opinion of the International Searching Authority mailed May 27, 2021, issued in corresponding International Application No. PCT/FR2021/050282, filed Feb. 17, 2021, 6 pages.

International Preliminary Report on Patentability mailed Aug. 23, 2022, issued in corresponding International Application No. PCT/FR2021/050282, filed Feb. 17, 2021, 1 page.

* cited by examiner

TURBOMACHINE MODULE EQUIPPED WITH A BLADE PITCH-CHANGING SYSTEM OF A STATOR VANE

TECHNICAL FIELD OF THE DISCLOSURE

The present disclosure relates to the field of the turbomachines and in particular to a turbomachine module comprising an unducted propeller. It also applies to the corresponding turbomachine.

TECHNICAL BACKGROUND

Turbomachines comprising at least one unducted propeller are known as "open rotor" or "unducted fan". In this category of turbomachine, there are those with two unducted and counter-rotating propellers (known as UDF for "Unducted Dual Fan") or those with a single unducted propeller and a straightener comprising several stator vanes (known as USF for "Unducted Single Fan"). The propeller or the propellers forming the propulsion portion may be placed at the rear of the gas turbine (or engine) so as to be of the pusher type or at the front of the gas turbine so as to be of the puller type. These turbomachines are turboprop engines that differ from turbojet engines by the use of a propeller outside the nacelle (unducted) instead of an internal fan. This allows to increase the bypass ratio very significantly without being penalized by the mass of the casings or nacelles intended to surround the blades of the propeller or fan. Examples of turboprop engines are described in the documents FR-A1-3082230 and US-A1-2017/102006.

In the case of turbomachines with a single unducted propeller and a straightener, the latter can be of the variable pitch type so as to improve the performance of the turbomachine, in particular from an aerodynamic point of view. The vanes of the straightener are oriented according to the need and phases of flight (take-off, cruise, landing, etc.) However, the integration of means allowing the pitch of the blades of the straightener is a problem in terms of mass, drag, bulk and complexity of these means according to the architecture of the turbomachine.

SUMMARY OF THE DISCLOSURE

The objective of the present disclosure is to provide a turbomachine module with a system for changing the pitch of the blades of a straightener whose integration is facilitated while avoiding significant structural modifications.

This is achieved in accordance with the disclosure by a turbomachine module with longitudinal axis X, comprising an unducted propeller driven in rotation about the longitudinal axis and at least one straightener comprising a plurality of unducted, variable pitch stator vanes, extending along a radial axis perpendicular to the longitudinal axis from a stationary casing, the module comprising a first system for changing the pitch of the blades of the stator vanes which comprises:
   at least one first control means comprising a first stationary body connected to the stationary casing and a first body axially movable with respect to the first stationary body,
   at least one first connection mechanism connecting each stator vane to the first movable body of the first control means, the first connection mechanism comprising:
   a connection annulus, centred on the longitudinal axis, connected to the roots of each stator vane and
   at least one lever connected, on the one hand, to the connection annulus and, on the other hand, to the first movable body of the first control means.

Thus, this solution allows to achieve the above-mentioned objective. In particular, such a configuration is simple to implement and allows to simplify the kinematics of the pitch change of the stator vanes. Indeed, with the first connection mechanism, all the blades change their orientations simultaneously and without involving many components that could penalize the mass and make the kinematics more complex.

In embodiments, the module also comprises one or more of the following characteristics, taken alone or in combination:
   the first connection mechanism comprises a plurality of arms, each of which is connected to a stator vane and the connection annulus.
   each arm comprises a first end which is provided with a ball joint connection passed through by a first hinge axis carried by the connection annulus and a second end connected to the root of a stator vane according to an embedded connection.
   the lever is held by a support that is secured to the stationary casing and is pivotally connected to the support.
   the lever has an L shape with a first branch and a second branch comprising respectively a first and a second distal end, the first distal end of the first branch is connected in a pivot connection with an axial rod of the first movable body of the first control means and the second distal end of the second branch comprises a ball joint passed through by a second hinge axis carried by the connection annulus.
   the first pitch change system comprises two first control means and two levers connected respectively to the first control means and to the connection annulus.
   the first pitch change system is installed in an annular space of an external casing partly delimiting a primary duct in which a primary air flow circulates.
   the external casing carries a splitter nose and the first control means are arranged at the level of the splitter nose.
   the stator vanes are configured to pivot between −10° and +10°.
   the connection annulus is unique.
   the first hinge axes of the arms are regularly arranged around the longitudinal axis X.
   the module comprises a second system for changing the pitch of the movable blades of the propeller, which comprises:
      a second control means comprising a second body axially movable with respect to a second stationary body mounted on an internal casing, the movable blades being mounted on a rotating casing carried by the internal casing,
      at least one load transfer bearing comprising an internal ring connected to the second movable body and an external ring; and
      a second mechanism for connecting the external ring to the blades of the propeller,
   the internal casing and the external casing at least partly delimit a primary duct in which a primary air flow circulates.

The disclosure further relates to an aircraft turbomachine comprising at least one module as mentioned above and a gas turbine for driving the unducted propeller in rotation.

BRIEF DESCRIPTION OF THE FIGURES

The disclosure will be better understood, and other purposes, details, characteristics and advantages thereof will become clearer upon reading the following detailed explanatory description of embodiments of the disclosure given as purely illustrative and non-limiting examples, with reference to the appended schematic drawings in which.

DETAILED DESCRIPTION OF THE DISCLOSURE

Figure 1:
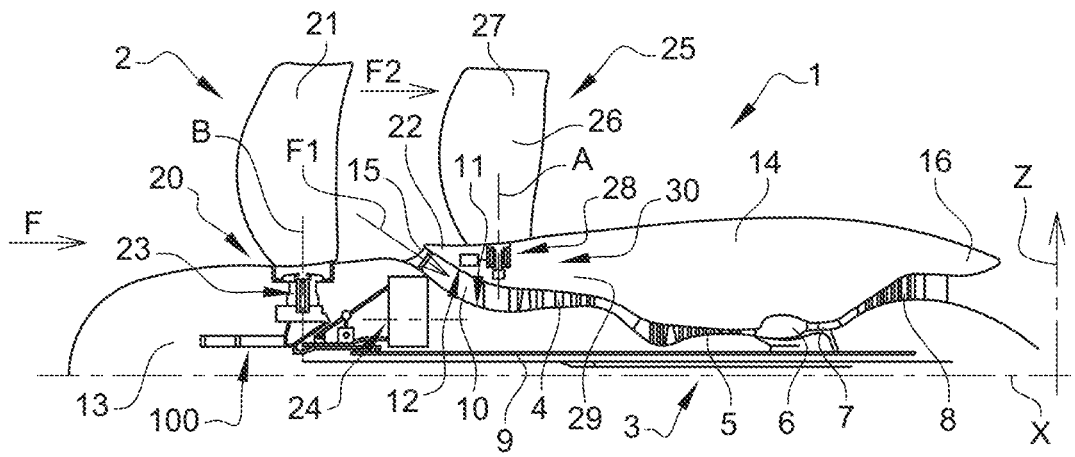
FIG. 1 is a schematic view, in axial and partial cross-section, of an example of turbomachine with a single unducted propeller to which the disclosure applies.

The disclosure applies to a turbomachine 1 comprising an unducted propeller 2 for mounting on an aircraft. Such a turbomachine is a turboprop engine as shown in FIG. 1. This turbomachine is known as "open rotor" or "unducted fan" as explained above.

In the present disclosure, and in general, the terms "upstream", "downstream", "axial" and "axially" are defined in relation to the flow of the gases in the turbomachine and here along the longitudinal axis X (and even from left to right in FIG. 1). Similarly, the terms "radial", "internal" and "external" are defined with respect to a radial axis Z perpendicular to the longitudinal axis X and with respect to the distance from the longitudinal axis X. Furthermore, the identical or substantially identical elements and/or 10 with the same functions are represented by the same numerical references.

The turbomachine 1 comprises a gas turbine or engine 3 which typically comprises, from upstream to downstream, a low-pressure compressor 4, a high-pressure compressor 5, a combustion chamber 6, a high-pressure turbine 7 and a low-pressure turbine 8. The low-pressure compressor 4 and the low-pressure turbine 8 are mechanically connected by a low-pressure shaft 9 so as to form a low-pressure body. The high-pressure compressor 5 and the high-pressure turbine 7 are mechanically connected by a high-pressure shaft so as to form a high-pressure body. The high-pressure shaft extends inside the low-pressure shaft 9 and are coaxial In another configuration not shown, the low-pressure body comprises the low-pressure compressor which is connected to an intermediate pressure turbine. A free power turbine is mounted downstream of the intermediate pressure turbine and is connected to the propeller described below via a power transmission shaft to drive it in rotation.

A primary air flow F1 circulates in a primary duct 10 which passes through the gas turbine 3. The primary duct 10 is radially delimited by a radially internal wall 11 and a radially external wall 12. The radially internal wall 11 is carried by an internal casing 13. The radially external wall 12 is carried by an external casing 14. The primary air flow F1 enters the gas turbine 3 through an annular air inlet 15 and exits through a primary nozzle 16 which is arranged downstream of the gas turbine 3

The turbomachine comprises a rotating casing 20 centred on the longitudinal axis X and rotating about the longitudinal axis X. The rotating casing 20 carries a ring gear of movable blades 21 forming the propeller 2. The rotating casing 20 is mounted so that it can be moved relative to the internal casing 13 which supports it. In the example shown in FIG. 1, the propeller 2 is mounted upstream of the gas turbine (puller configuration). Alternatively, the propeller is mounted downstream of the gas turbine (pusher configuration). The air flow F entering the turbomachine passes through the propeller blades 21 to form a secondary air flow F2. This secondary air flow circulates around the external casing 14. The air flow F divides into a primary air flow and a secondary air flow at the level of a splitter nose 22 carried by the external casing 14. Each blade 21 of the propeller 2 comprises a root 23 and extends radially outward from the root 23. The blades of the propellers are not ducted as shown in FIG. 1 (the turbomachine shown is of the "USF" type, i.e. as explained above, it comprises a single unducted propeller and a straightener comprising several unducted stator vanes).

The power shaft or low-pressure shaft 9 (of the free power turbine and of the low-pressure turbine respectively) drives the propeller 2 by means of a reducer 24 which compresses the air outside the external casing 14 and provides most of the thrust. The reducer 24 can be of the planetary gear train or epicyclic gear train type.

As can be seen in FIG. 1, the turbomachine 1 comprises a straightener 25 comprising a plurality of stator vanes 26 (or stationary vanes) known by the acronym "OGV" for Outlet Guide Vane. The stator vanes 26 are evenly distributed about the longitudinal axis X and extend radially into the secondary air flow. The stator vanes 26 are carried by a stationary structure secured to the external casing 14. In particular, each stator vane 26 comprises a blade 27 that extends radially from a root 28. We understand that the stator vanes 26 are unducted.

Figure 2:
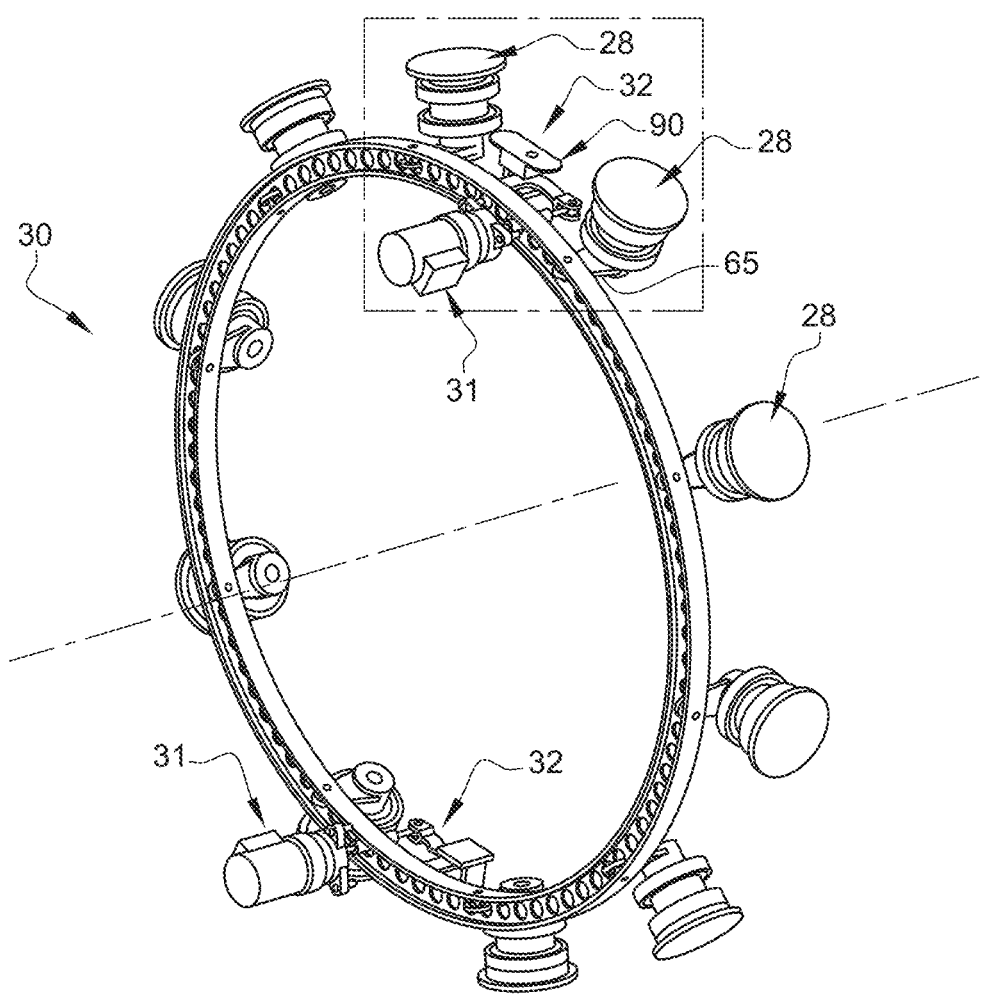
FIG. 2 shows a perspective view of a system for changing the pitch of the blades of the stator vanes of a turbomachine with a single unducted propeller to which the disclosure applies.

In FIG. 2, ten stator vanes 26 are mounted on the external casing 14. Advantageously, the stator vanes 26 are variable in pitch so as to optimize the performance of the turbomachine. For this purpose, the turbomachine comprises a first system 30 for changing the pitch of the blades of the stator vanes. In FIG. 2, the first pitch change system 30 comprises at least one first control means 31 and at least one first connection mechanism 32 connecting each stator vane 26 to the first control means 31.

Figure 3:
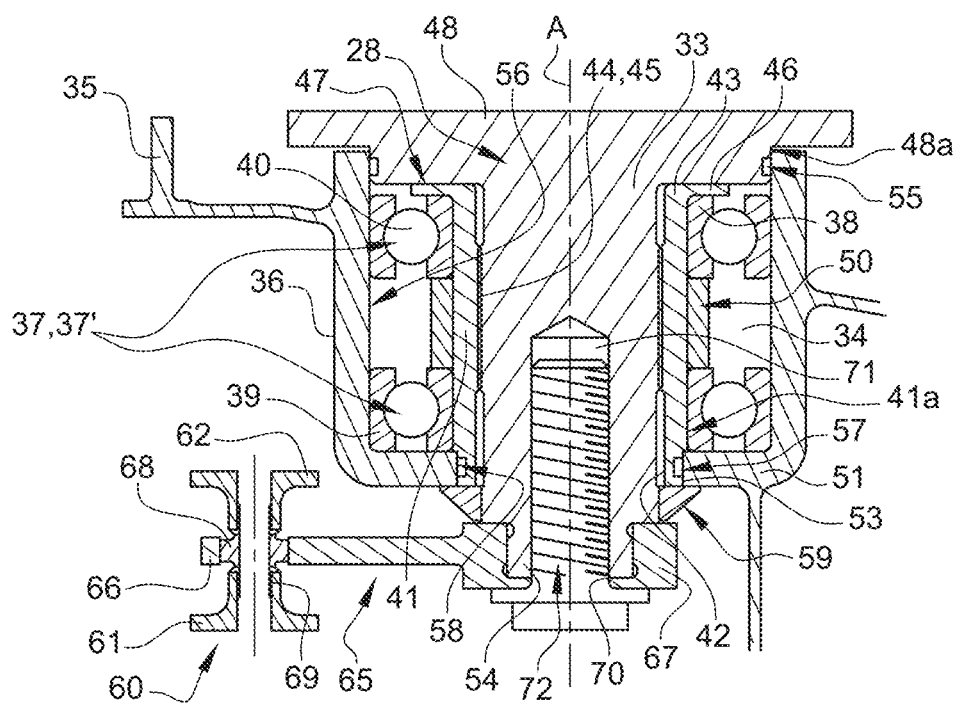
FIG. 3 is a partial axial cross-sectional view of a turbomachine stator vane root according to the disclosure.

FIG. 3 shows an axial cross-sectional view of a root 28 of a stator vane 26. Typically, the root 28 is in the form of a pivot 33 that is pivotally mounted along an axis A in a housing 34. In particular, an annular shroud 35 centred on the longitudinal axis X comprises a plurality of housings 34 distributed around its circumference. The annular shroud 35 is secured to the external casing 14. Each housing 34 is delimited by a cylindrical skirt 36 extending along the radial axis Z. The pivot 33 of the root is pivotally mounted by means of at least one guide bearing 37. In the present example, two guide bearings 37, 37' are superimposed along the radial axis Z. These bearings 37 are preferably, but not restrictively, rolling bearings.

Each bearing 37, 37' comprises an internal ring 38 that is secured in rotation to the pivot 33 and an external ring 39 that surrounds the internal ring 38. The rollings are installed between the internal surfaces of the internal and external rings 38, 39 which form tracks. The rollings here comprise balls 40.

A cylindrical socket 41 is installed in each housing 34 so as to connect the internal ring 38 of each bearing 37, 37' to the root of each stator vane 26. The socket 41 is centred on the pitch axis A of the stator vanes. Each socket 41 extends between a first end 42 and a second end 43. Each socket 41 has internal splines 44 arranged on an internal cylindrical face. The internal splines 44 are intended to couple with external splines 45 provided on an external surface of the pivot 33 of each root of a stator vane 26. The second end 43 of the socket 41 comprises a collar 46 that extends radially outwardly from the (cylindrical) body of the socket 41 relative to the axis A. The collar 46 forms a radially external surface 47 on which a hub 48 of the pivot 33 rests. The external ring 39 of each bearing 37, 37' is carried by the shroud 35, in particular the cylindrical skirt 36. Between each bearing extends along the radial axis Z a spacer 50 intended to maintain a distance (here radial) between the two bearings 37, 37'. This spacer 50 is advantageously, but not restrictively, placed between two internal rings 38 of the bearings 37, 37'.

The shroud 35 also comprises an annular bottom wall 51 secured to the cylindrical skirt 36. The bottom wall comprises holes 53 that pass through it on either side along the radial axis and allow the free end 54 of the pivot 33 to pass through.

Sealing elements are arranged in each housing 34 so as to prevent lubricant leakage from the bearings to the outside of the housing. In particular, a first annular seal 55 is arranged between an internal surface 56 of the cylindrical skirt 36 and a peripheral border 48a of the hub 48. A second seal 57 is provided between an internal border 58 of a hole 53 and an external surface 41a of the socket 41.

Finally, in order to avoid any displacement of the pivot 33 along the radial axis, a holding element 59 allows the free end 54 of the pivot to be attached to the bottom wall 51 of the shroud 35. The holding element 59 comprises a nut. Other analogous threaded elements allowing to attach the pivot to the shroud are of course possible.

Figure 4:
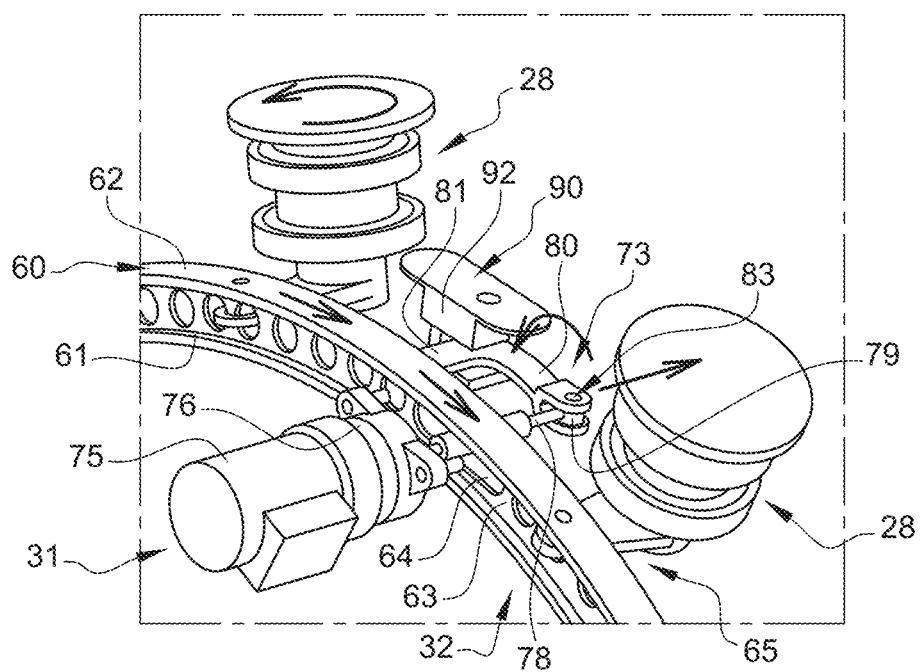
FIG. 4 is a partial perspective view of a stator vane pitch change system of a turbomachine with a single unducted propeller according to the disclosure.

With reference to FIGS. 3 and 4, the first connection mechanism 32 comprises a connection annulus 60 that is centred on the longitudinal axis X. The connection annulus 60 comprises a first annular segment 61 and a second annular segment 62 that are concentric and coaxial. The first and second segments 61, 62 are radially spaced apart and are connected to each other by bridges 63 that form through openings 64 along the longitudinal axis X. The connection annulus 60 is connected to the roots of each stator vane.

For this purpose, the first connection mechanism 32 comprises at least one arm 65 connected on the one hand to the connection annulus 60 and on the other hand to the root 28 of a vane 26. The arm 65 extends between a first end 66 and a second end 67. The first end 66 is provided with a ball joint 68 (see FIG. 3) which is passed through by a hinge axis 69 carried by the connection annulus 60. The hinge axis 69 is mounted between the first segment 61 and the second segment 62 and is parallel to the radial axis Z. The second end 67 is connected to the root 28 of a stator vane 26 in an embedded connection. As can be seen in FIG. 3, the second end 67 comprises an orifice 70 that passes through it on either side along the radial axis. The free end 54 of each pivot is mounted in each orifice 70. Advantageously, but not restrictively, the pivot 33 comprises a radial bore 71 that opens at the level of the free end 54 thereof. An attachment member 72 such as a screw is received in the radial bore 71 to attach the arm 65 to the root of the stator vane 26. In the example shown, there are as many arms as there are stator vanes. And each arm is connected to a vane root and to the connection annulus 60.

Figure 5:
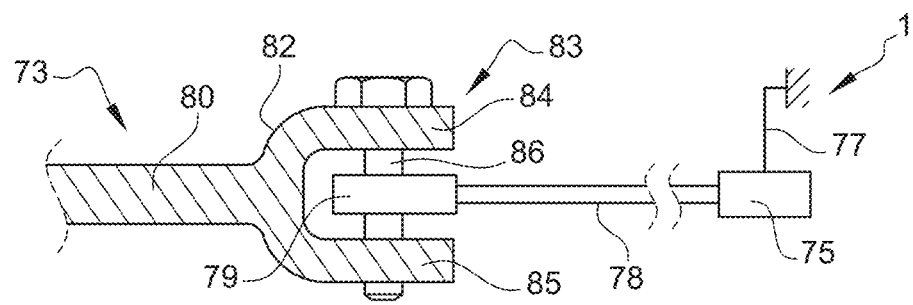
FIG. 5 is an axial cross-sectional view of a lever of a connection mechanism connected to a rod of a movable body of a control means according to the disclosure.

With reference to FIGS. 4 and 5, the first connection mechanism 32 also comprises at least one lever 73 which is connected, on the one hand, to the connection annulus 60 and, on the other hand, to the first control means 31.

In this example, there are two first control means 31 and two levers 73 that cooperate with each other. The first two control means 31 allow to transmit the forces to the connection annulus 60 and the pitch change of the blades of the stator vanes 26. The first connecting means are diametrically opposed with respect to the axis of the connection annulus 60.

Each first control means 31 comprises a first stationary body 75 and a first body 76 movable relative to the first stationary body. Each first stationary body 75 is connected to a stationary shroud 77 (see FIG. 5) of the turbomachine so as to be immovable in translation and in rotation. In particular, the stationary shroud 77 is mounted on the external casing 14. Each first movable body 76 displaces in translation axially with respect to the respective first stationary body 75 along the longitudinal axis X. Each first movable body 76 comprises an axial rod 78 whose free end 79 is connected to a lever 73.

Each lever 73 is L-shaped with a first branch 80 and a second branch 81 connected to each other. In FIG. 5, the first branch 80 comprises at a first distal end 82 (see FIG. 4) a clevis 83. The latter comprises, according to FIG. 5, a first ear 84 and a second ear 85 superimposed and spaced along the radial axis. The first and second ears 84, 85 extend in planes substantially parallel to each other. A hinge shaft 86 extends along an axis parallel to the radial axis between the first and second ears. The free end 79 of the axial rod 78 comprises an eyelet through which the hinge shaft 86 passes so as to make a pivot connection.

Figure 6:
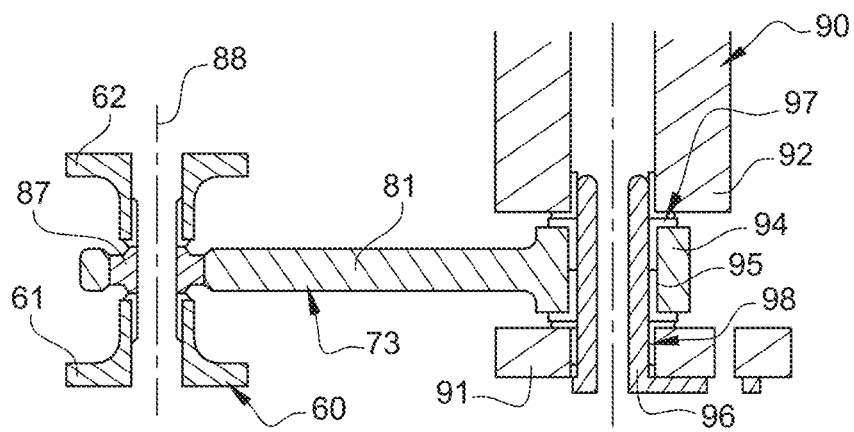
FIG. 6 is an axial cross-sectional view of a lever of a connection mechanism connected to a support and to a connection annulus according to the disclosure.
Figure 7:
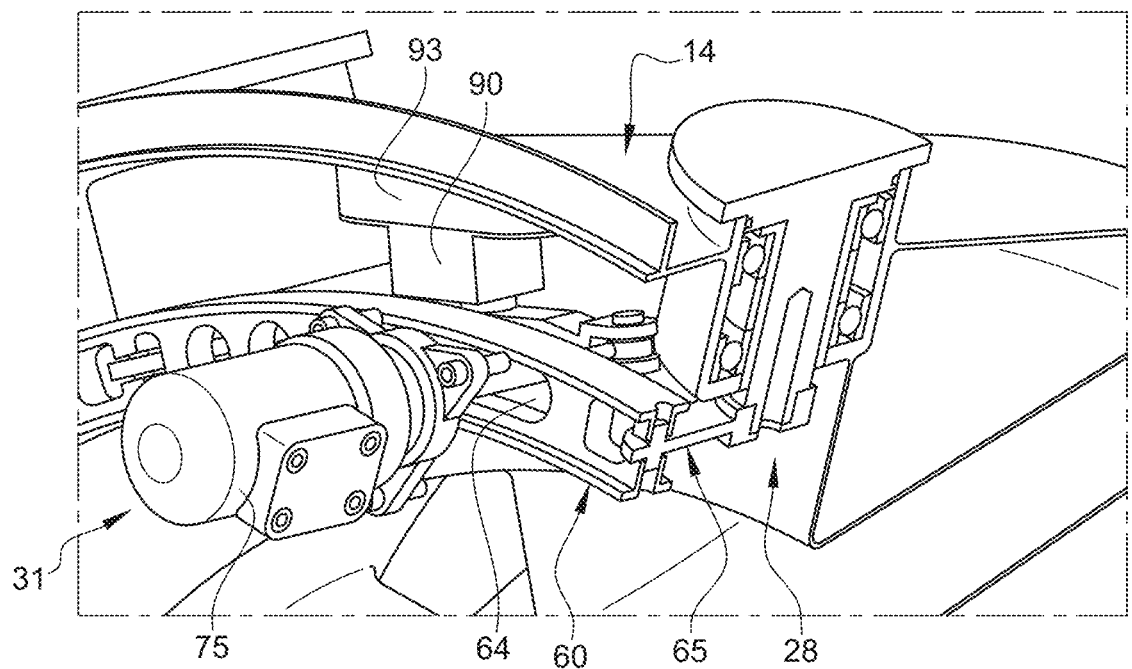
FIG. 7 illustrates according to a perspective view and upstream an example of a system for changing the pitch of the blades of the stator vanes, which system being arranged in a stationary casing of a turbomachine according to the disclosure.
Figure 8:
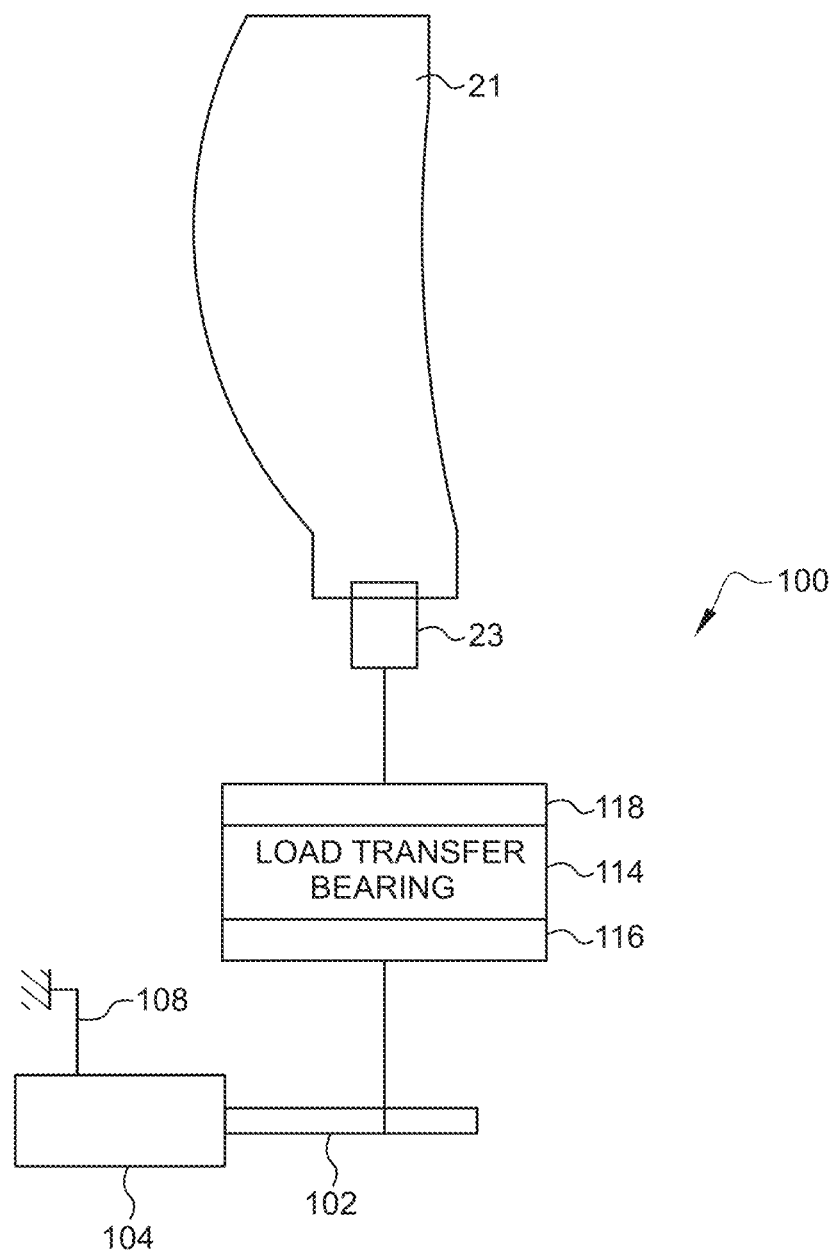
FIG. 8 is a schematic depiction of a second pitch change system for changing the pitch of the movable blades of the propellor according to the disclosure.

In FIG. 6, the second branch 81 comprises a ball joint 87 through which a second hinge axis carried by the connection annulus 60 passes. The second hinge axis is mounted between the first segment 61 and the second segment 62 and is parallel to the radial axis Z.

With reference to FIG. 6, the lever 73 is mounted on a support 90 that is secured to the stationary structure of the turbomachine. The stationary structure is secured to the external casing 14. The support 90 allows the lever 73 to be held relative to the external casing 14. In particular, at the level of the junction between the first branch 80 and the second branch 81, the lever 73 is connected to the support 90 by a pivot connection. As can be seen in FIG. 4, the support comprises a base plate 91 that is connected to a main body 92. The main body is attached to the stationary structure 93 secured to the external casing of the turbomachine. The attachment is done by means of attachment members such as screws and nuts. The base plate 91 extends in a plane that is perpendicular to the radial axis and parallel to the plane in which the main body is defined. The base plate 91 forms a C or a U shape with the main body 92. The space between the base plate 91 and the main body 92 receives a summit 94 of the lever 73 defined by the junction of the first and second branches. The summit 94 is passed through by an orifice 95 along a radial axis. A pivot member 96 carried by the main body and the base plate 91 extends through the orifice of the lever and along a radial axis Z. An upper cushion 97 and a lower cushion 98 are arranged in the orifice 95. The pivot member passes through the cushions 97, 98.

Each lever 73 then has three axes of rotation.

Advantageously, the first control means are each a hydraulic cylinder comprising the stationary body and the movable body. Each first control means is connected to a fluidic supply source for supplying pressurized oil to chambers (not shown) of the stationary body. The movable body extends inside the stationary body.

Advantageously, the pitch change system is arranged in an annular space 29 defined in the external casing 14. Each first control means is arranged at the level of the splitter nose 22 as shown in FIG. 1. In particular, each first control means is arranged upstream of the roots 28 of the stator vanes and also upstream of the connection annulus 60.

The axial rod 78 of each movable body extends through a through opening 64 defined in the connection annulus 60.

We will now present the kinematics of the various members during the change of pitch of the blades of the stator vanes. All the blades of the stator vanes 26 pivot simultaneously. As a first movable body 76 of a first control means 31 displaces in translation along the longitudinal axis, the free end 79 of the axial rod 78 of this first movable body 76 also displaces in translation along the axis X and drives the rotation of a lever 73 to which it is connected to the support. This lever 73, which is also connected to the connection annulus 60, drives in rotation the connection annulus 60 about the longitudinal axis, which generates the change in pitch of the blades of the stator vanes 26 connected to the connection annulus 60 via the arms 65. In this way, with a translation of the first movable body of the cylinders and a rotation of the levers 73 connected to the single connection annulus 60, all the blades of the stator vanes 26 change their pitch or their orientation. The blades of the stator vanes 26 rotate between −10° and +10°.

The turbomachine module may comprise a second system 100 for changing the pitch of the movable blades of the propeller 2, as shown in FIG. 1. This second pitch change system is arranged upstream of the gas turbine 3 and radially below the roots of the movable blades 21 of the propeller 2. This pitch change system 100 comprises a second control means 101 comprising a second body 102 axially movable relative to a second stationary body mounted on the internal casing 13. The pitch change system also comprises at least one load transfer bearing 103 comprising an internal ring connected to the second movable body and an external ring, as well as a second mechanism 104 for connecting the external ring to the movable blades of the propeller. The system for changing the pitch of the blades of the propeller 2 allows to vary the pitch of the blades 21 around their pitch axes so that they occupy different angular positions according to the operating conditions of the turbomachine and the phases of flight concerned, such as an extreme working position (thrust reversal position) and an extreme feathering position of the blades. The second control means is also a hydraulic cylinder comprising the second stationary body and the second movable body. The connection mechanism here comprises connecting rods.

The invention claimed is:

1. A turbomachine module with longitudinal axis, comprising:
    an unducted propeller driven in rotation about the longitudinal axis; and
    at least one straightener comprising a plurality of unducted variable pitch stator vanes extending along a radial axis perpendicular to the longitudinal axis from a stationary casing, wherein each variable pitch stator vane comprises a blade and a root;
    a first pitch change system for changing a pitch of the blades of the stator vanes, wherein the first pitch change system comprises:
        at least one first actuator comprising a first stationary body connected to the stationary casing and a first movable body axially movable with respect to the first stationary body, and
        at least one first connection mechanism connecting each stator vane to the first movable body of the first actuator, the first connection mechanism comprising:
            a connection annulus centered on the longitudinal axis and connected to the root of each stator vane; and
            at least one lever connected to the connection annulus and to the first movable body of the first actuator;
    a support fixedly secured to an external casing,
    wherein the at least one lever has a first branch and a second branch, wherein the lever is pivotally connected to the support between the first branch and the second branch, the external casing surrounding the connecting annulus, and
    an axial rod connected to the first movable body of the first actuator.

2. The module according to claim 1, wherein the at least one first connection mechanism further comprises a plurality of arms, each of which is connected to one stator vane of the plurality of vanes and to the connection annulus.

3. The module according to claim 2, wherein each arm comprises a first end which is provided with a ball joint connection passed through by a first hinge axis carried by the connection annulus and a second end connected to the root of the respective stator vane according to a fixed connection.

4. The module according to claim 1, wherein the at least one lever has an L shape with a first branch and a second branch comprising respectively a first and a second distal end, the first distal end of the first branch is connected in a pivot connection with an axial rod of the first movable body of the first actuator, and the second distal end of the second branch comprises a ball joint through which passes a second hinge axis carried by the connection annulus.

5. The module according to claim 4, wherein the axial rod of each movable body extends through a through opening defined in the connection annulus.

6. The module according to claim 1, wherein the first pitch change system comprises two first actuator and two levers connected respectively to the first actuator and to the connection annulus.

7. The module according to claim 1, wherein the first pitch change system is installed in an annular space of the external casing partly delimiting a primary duct in which a primary air flow circulates.

8. The module according to claim 7, wherein the external casing carries a splitter nose and the first actuator are arranged at the level of the splitter nose.

9. The module according to claim 1, wherein the stator vanes are configured to pivot between −10° and +10°.

10. The module according to claim 1, wherein the connection annulus is one part.

11. The module according to claim 1, further comprising a second pitch change system for changing the pitch of the movable blades of the propeller which comprises:
- a second actuator comprising a second body axially movable with respect to a second stationary body mounted on an internal casing, the movable blades being mounted on a rotating casing carried by the internal casing;
- at least one load transfer bearing comprising an internal ring and an external ring, the internal ring connected to the second movable body; and
- a second connector for connecting the external ring to blades of the propeller.

12. The module according to claim 11, wherein the internal casing and the external casing delimit, at least partly, a primary duct in which a primary air flow circulates.

13. An aircraft turbomachine comprising at least one module according to claim 1 and a gas turbine intended to drive the unducted propeller in rotation.

14. The module according to claim 1, wherein the external casing comprises a plurality of housings distributed around its circumference, each root is pivotally mounted in one of said housings.

15. The module according to claim 1, wherein the support is distinct from the connecting annulus.

16. A turbomachine module with longitudinal axis, comprising:
- an unducted propeller driven in rotation about the longitudinal axis; and
- at least one straightener comprising a plurality of unducted variable pitch stator vanes extending along a radial axis perpendicular to the longitudinal axis from a stationary casing;
- a first pitch change system for changing a pitch of at least one blade of the stator vanes, the first pitch change system comprising:
- at least one first actuator comprising a first stationary body connected to the stationary casing and a first movable body axially movable with respect to the first stationary body, and
- at least one first connection mechanism connecting each stator vane to the first movable body of the first actuator, the first connection mechanism comprising:
  - a connection annulus centered on the longitudinal axis and connected to a root of each stator vane; and
  - at least one lever connected to the connection annulus and to the first movable body of the first actuator,
- at least one support fixedly secured to an external casing, the at least one lever is pivotally connected to the support,
- wherein the at least one lever has an L shape with a first branch and a second branch comprising respectively a first distal end and a second distal end, the first distal end of the first branch is connected in a pivot connection with an axial rod of the first movable body of the first actuator, and the second distal end of the second branch comprises a ball joint through which passes a second hinge axis carried by the connection annulus,
- wherein the lever is pivotally connected to the support at an intersection of the first branch and the second branch, and wherein the support defines a stationary pivot axis, the lever arranged to pivot about the stationary pivot axis.

17. The module according to claim 16, wherein the axial rod of each movable body extends through a through opening defined in the connection annulus.

18. The module according to claim 16, wherein the external casing surrounds the connecting annulus and the lever is pivotally connected to the support between the first branch and the second branch.

19. A turbomachine module with longitudinal axis, comprising:
- an unducted propeller driven in rotation about the longitudinal axis; and
- at least one straightener comprising a plurality of unducted variable pitch stator vanes extending along a radial axis perpendicular to the longitudinal axis from a stationary casing, wherein each variable pitch stator vane comprises a blade and a root;
- a first pitch change system for changing a pitch of the blades of the stator vanes, wherein the first pitch change system comprises:
- at least one first actuator comprising a first stationary body connected to the stationary casing and a first movable body axially movable with respect to the first stationary body, and
- at least one first connection mechanism connecting each stator vane to the first movable body of the first actuator, the first connection mechanism comprising:
  - a connection annulus centered on the longitudinal axis and connected to the root of each stator vane; and
  - at least one lever connected to the connection annulus and to the first movable body of the first actuator,
- a support secured to an external casing,
- wherein the at least one lever is pivotally connected to the support, the external casing surrounding the connecting annulus,
- an axial rod connected to the first movable body of the first actuator, wherein the axial rod of each movable body extends through a through opening defined in the connection annulus.

* * * * *